US011981443B2

(12) United States Patent
Haley

(10) Patent No.: US 11,981,443 B2
(45) Date of Patent: May 14, 2024

(54) AUTOMATIC EJECTION SAFETY TECHNOLOGY WITH A SKYDIVING SIMULATOR FOR IMPROVING PILOT SAFETY

(71) Applicant: Mark Haley, McKinney, TX (US)

(72) Inventor: Mark Haley, McKinney, TX (US)

( * ) Notice: Subject to any disclaimer, the term of this patent is extended or adjusted under 35 U.S.C. 154(b) by 789 days.

(21) Appl. No.: 16/852,505

(22) Filed: Apr. 19, 2020

(65) Prior Publication Data

US 2020/0398991 A1   Dec. 24, 2020
US 2024/0076047 A9   Mar. 7, 2024

Related U.S. Application Data

(63) Continuation-in-part of application No. 15/996,433, filed on Jun. 2, 2018, now Pat. No. 10,782,524.
(Continued)

(51) Int. Cl.
*B64D 25/08* (2006.01)
*B64C 13/18* (2006.01)
(Continued)

(52) U.S. Cl.
CPC .............. *B64D 25/08* (2013.01); *B64C 13/18* (2013.01); *G06F 3/012* (2013.01); *G09B 9/00* (2013.01); *G01S 19/42* (2013.01)

(58) Field of Classification Search
CPC ........ B64D 25/08; B64D 25/00; B64C 13/18; B64C 39/02; G06F 3/012; G06F 3/011;
(Continued)

(56) References Cited

U.S. PATENT DOCUMENTS 2,820,602 A * 1/1958 Foster .................... B64D 25/10
244/121
3,177,612 A * 4/1965 Giossi .................. A63H 27/004
446/64
(Continued)

FOREIGN PATENT DOCUMENTS

WO    WO-03099656 A1 * 12/2003 ............. B64C 25/56
WO    WO-2005016456 A2 * 2/2005 ............. B64D 25/10

OTHER PUBLICATIONS

Steven Dondero, Team Leader, John Kovalicky, Gary Baumgartner, etc., "Final Accident Investigation Factual Report, Smith Prairie Smokejumper Fatality", U.S. Department of Interior, BLM, Sep. 27, 2013, Updated May 2, 2014 pp. 18, 50-56 Human Factors Analysis by Randy McCalip LtCol, USAF, BSC.
(Continued)

*Primary Examiner* — Yonel Beaulieu

(57) ABSTRACT

This invention provides an integrated pilot autonomous ejection system with skydiving safety/training which combines sensors, hardware and software technologies to improve pilot training and safety. It offers pilots state-of-the-art cost-effective Virtual Reality Skydiving and flight simulations which prepares pilots on skydiving after ejections and for the dangers of Vertigo and G-LOC which can result in a crash in seconds. Related flight data including cameras which constantly monitors pilots can be used for debriefings/accident investigations which can be done in minutes. The goal is to improve pilot safety during the transition to fully autonomous fleets of fighter jets which have better warrior capabilities.

10 Claims, 3 Drawing Sheets

Related U.S. Application Data

(60) Provisional application No. 62/864,529, filed on Jun. 21, 2019.

(51) Int. Cl.
  *G06F 3/00* (2006.01)
  *G06F 3/01* (2006.01)
  *G09B 9/00* (2006.01)
  *G01S 19/42* (2010.01)

(58) Field of Classification Search
  CPC . G06F 3/017; G09B 9/00; G01S 19/42; G01S 19/17; G01S 19/18; G01S 19/19; G01S 19/00; G05D 1/00
  See application file for complete search history.

(56) References Cited

U.S. PATENT DOCUMENTS

| | | | |
|---|---|---|---|
| 6,929,480 B2 | 8/2005 | Lee et al. | |
| 7,819,664 B2 | 10/2010 | Petruk | |
| 9,586,689 B2 | 3/2017 | Cattani | |
| 9,682,326 B2 | 6/2017 | Burroughs | |
| 9,843,771 B2 | 12/2017 | Shuster | |
| 9,863,772 B1 | 1/2018 | Moyerman et al. | |
| 10,332,405 B2* | 6/2019 | Kopardekar | G08G 5/0091 |
| 10,577,112 B2 | 3/2020 | Pourzadeh | |
| 10,782,524 B2* | 9/2020 | Haley | G06F 3/011 |
| 2003/0152145 A1* | 8/2003 | Kawakita | H04N 7/088 |
| | | | 348/E7.086 |
| 2009/0212160 A1* | 8/2009 | Beauchamp | B64D 25/10 |
| | | | 244/122 AG |
| 2016/0275801 A1* | 9/2016 | Kopardekar | G08G 5/0082 |
| 2017/0233088 A1* | 8/2017 | Homan | B64D 17/80 |
| | | | 701/3 |
| 2018/0356635 A1* | 12/2018 | Haley | A63F 13/65 |
| 2020/0130831 A1* | 4/2020 | Luca | B64C 5/12 |
| 2020/0398991 A1* | 12/2020 | Haley | G01S 19/19 |

OTHER PUBLICATIONS

Swatmav Dangerous YouTube Spin (sit while watching), YouTube Video entitled "GCSpinFinal" asserted to be uploaded on Aug. 29, 2017 retrieved from the internet at: https://youtu.be/U_Q82cvzQHA on Jun. 2, 2018.
Jim Karels (Team Leader), Mike Dudley (Team Deputy Lead, Director USFS), "Serious Accident Investigation Report, Yarnell Hill Fire, Jun. 30, 2013", Arizona State Forestry Division, Sep. 23, 2013. pp. 1-4, 26-27, 42-43.
Swatmav, Skydive Simulation into Grand Canyon YouTube Video entitled "ADBestGrandC" asserted to be uploaded on Sep. 4, 2014 retrieved from the internet at: http://youtu.be/n2srxXJIQs8 on Jun. 2, 2018.
Tom Harbour, Director, "U.S. Forest Service Ram-Air Parachute System Implementation Project", Change Management Implementation Plan (CMIP), U.S. Forest Service, Jun. 2015, p. 71-72.
Swatmav, YouTube Robotic Flight Test YouTube Video entitled "ALandingJan. 2014" asserted to be uploaded on Jan. 20, 2014, 2014 retrieved from the internet at: https://www.youtube.com/watch?v=jEDibD18O4E&feature=youtube_gdata on Jun. 2, 2018.
Sales Brochure Redacted for the Patent Office, Analytical Software inc. Apr. 2018.
Draft of paper for speech in Korea in the summer of 2018 Kevin Huang, Daming Xing, Mark Haley, An Intelligent Sensor-Driven Skydive Tracking System.
60 Minute report on how 5 U.S. military personnel were killed by friendly fire on Jun. 9, 2014 https://www.cbsnews.com/news/why-were-five-u-s-soldiers-killed-by-an-american-bomber-in-afghanistan/.
Sales Brochure Redacted for Patent Office, Analytical Software Inc. Revolutionary Ejection Technology and Skydiving Training for Pilots which can save Lives, 2019-2020 updates.

\* cited by examiner

Key US Built Non-Combat Fighter Jet Crashes (2016 - 2018)

| Date | Jet | Cause of Crash | Pilot Ejected | Pilot Survived | Patent could have saved |
|---|---|---|---|---|---|
| 1/14/16 | F-16 | Mechanical Problem Jordon | 2 Ejected | 2 Survived | Yes |
| 1/21/16 | F-16 | Crash Ground AZ Taiwan Pilot | No | 1 Died | Yes |
| 1/27/16 | F-16 | Crash Ground Egypt | No | 2 Died | Yes |
| 3/29/16 | F-16 | Engine problems Afghanistan | 1 Ejected | 1 Survived | Yes |
| 3/30/16 | F-16 | Crash during training | 2 Ejected | 2 Survived | Yes |
| 6/2/16 | F-16 | Crash during landing | 1 Ejected | 1 Survived | Yes |
| 6/7/16 | F-16 | 2 F-16 collided | 2 Ejected | 2 Survived | Yes |
| 10/5/16 | F-16 | Crash during Landing Israel | 2 Ejected | 1 Died | Yes |
| 12/5/16 | F-16 | Crash during Takeoff Jordon | No | 1 Died | Yes |
| 3/14/17 | F-16 | Engine problem | 1 Ejected | 1 Survived | Yes |
| 6/21/17 | F-16 | Fire on Takeoff | 1 Ejected | 1 Survived | Yes |
| 9/5/2017 | F-16 | Crash during training | No | 1 Died | Yes |
| 4/5/18 | F-16 | G-LOC - Pilot unconscious | No | 1 Died | Yes |
| 4/24/18 | F-16 | Overruns Runway | Yes | Survived | Yes |
| 6/4/18 | F-16 | Crash into Taiwan Mountain | No | 1 Died | Yes |
| 1/12/16 | F/A-18 | Crashed during training | 1 ejected | 1 survived | Yes |
| 5/26/16 | F/A-18 | 2 F/A 18 collided | 4 ejected | 4 survived | Yes |
| 7/28/16 | F/A-18 | Crashed during Night Training | No | 1 died | Yes |
| 8/29/16 | F/A-18 | Crashed Training in Switzerland | No | 1 died | Yes |
| 10/25/16 | F/A-18 | Crash on Landing | 1 ejected | 1 survived | Yes |
| 11/9/16 | F/A-18 | Collision 1 Jet Crashed | 1 ejected | 1 survived | Yes |
| 12/7/16 | F/A-18 | Technical Problem | 1 ejected | 1 died | Yes |
| 4/21/17 | F/A-18 | Landing Problems on Carrier | 1 ejected | 1 survived | Yes |
| 8/12/17 | F/A-18 | Landing Problems | 1 ejected | 1 survived | Yes |
| 3/14/18 | F/A-18F | Fire on Takeoff | 2 ejected | 2 died | Yes |
| 10/18/18 | F/A-18F | Engine Failure | No | 1 Died | Yes |
| 11/12/18 | F/A-18F | Mechanical Failure | 2 ejected | 2 Survived | Yes |
| 12/6/18 | F/A-18F | Mid-air collision | 1 ejected | 1 Died | NA |
| 6/11/18 | F-15 | Technical Problem | 1 ejected | 1 survived | Yes |
| 4/5/18 | F-15K | Crash into Korean Mountain | No | 2 Died | Yes |
| 9/28/18 | F-35B | Fuel Tube Problem | 1 Ejected | 1 Survived | Yes |
| 4/5/19 | F-35A | Vertigo during Night Flight | No | 1 Died | Yes |

20 of 38 pilots survived. Included 4/2019 F-35 crash
% Survived 52.6%     % who could have survived with patent     86.8%

*FIG. 1*

AUTOMATIC EJECTION SAFETY TECHNOLOGY WITH A SKYDIVING SIMULATOR FOR IMPROVING PILOT SAFETY

TECHNICAL FIELD

This invention is related to improving pilot safety during emergency ejections from aircraft with related easy-to-use skydiving simulators since the pilots must skydive after an ejection. The goal is to improve pilot safety during the transition to fully autonomous fleets of fighter jets which have better warrior capabilities.

BACKGROUND

This invention, the Automatic Ejection Safety Technology (AEST), improves jet fighter pilot safety related to emergency ejections from aircraft with related 3D Virtual Reality (VR) skydiving simulators and the integrated collection of GPS tracking data for 3D mapping for debriefings and accident investigations. The simulator also trains pilots to be aware of the dangers of Vertigo and Gravity Loss of Consciousness (G-LOC). Related actual flight data continuously improves the simulator. Ultimately jet fighters will be fully autonomous to improve maneuverability and offensive options unimpeded by the limitations of humans. Cameras would constantly monitor pilots during flights and there would be a breathalyzer and other data before flights if time is available. The goal: constantly monitor the condition of pilots flying $100 million jets. This data could be used for debriefings and/or accident investigations.

FIG. 1 highlights the causes of crashes of America's key fighters: F-15s, F-16s, F/A-18Fs and F-35s. In 2016-2018, 32 of these jets crashed, and 18 pilots died (47% of the 38 pilots) but 15 of those might have been saved with the safety systems in this patent. Moreover, related analysis shows that as many as 1 of 500 of these jets crash each year and recently F-35s were crashing at the rate of almost 1 per 400 jets/year. These statistics offer a compelling case for implementing the safety technology of this patent. The biggest customer for the F-35 is the US military which could purchase over 2,400 F-35s. Based on these statistics there could be 54 crashes of U.S. military F-35 crashes during 10 years delivery of these aircraft with 26 related pilot deaths. However, if this automatic ejection system in this patent was implemented there could be as few as 4 deaths. The system even prevents suicidal pilots from killing themselves.

If the AEST is enabled and it detects an impending crash, it: (1) either automatically ejects the pilot if there is not enough time to safely stop a crash, or (2) if it can the plane autonomously flies back to base without the need to eject the pilot. If the pilot was ejected, then the pilot's chute deploys, and the pilot safely lands. The existing systems don't autonomously eject the pilot. In June 2019, a 41-year-old Japanese pilot who had Vertigo and/or G-LOC crashed his F35 killing the pilot and destroying the $100 million F35. The ideal solution—both an autonomous autopilot to take control, if possible, if not then the AEST automatically ejects.

With existing technology, the pilot manually initiates an ejection. After an ejection (manual or automatic) their seat is thrust above the aircraft and within a few seconds their parachute is deployed. Then the pilot (now a skydiver) steers the parachute towards a safe landing while the jet crashes potentially killing people on the ground. Existing ejection seat patents focus on manual operations such as the Martin-Baker products which claims to have saved 7,402 pilots from 93 air forces. There are no related patents related to autonomously landing of the disabled aircraft. For example, Martin-Baker was involved in U.S. Pat. No. 9,241,545, Jan. 26, 2016, and U.S. Pat. No. 6,591,602 Jul. 15, 2003, and many others which focus on manual ejection seats without autonomous flight of the aircraft. While this patent recommends an improved autonomous seat ejection, if the system isn't effectively designed and/or tested it could be more dangerous than manual systems, so this is a disclaimer against implementing any poorly designed and/or tested automatic ejection systems and the patent writer and/or his company is not liable for implementation of this technology. For example, if the pilot blacks out and is automatically ejected, the pilot's, head, arms, etc. must be protected to avoid injury during exit.

Also, existing skydiving training technology for pilots is cumbersome and expensive at over $100,000 each and it requires have the student get into a harness (6/2016 GSA pricelist). Our lightweight skydiving system can be set up in minutes with hardware costing less than $5,000, $1/20^{th}$ the cost of this harness system plus we provide simulations to prepare pilots for the dangers of Vertigo and/or G-LOC (FIG. 3).

Experts say the best training is real skydives where the novice begins in tandem jumps with the instructor and progresses to becoming a certified skydiver. Also, existing training systems don't train well for malfunctions such as rotating at 60 rpm such as the tragic death of Mark Urban, "BLM Final Accident Investigation" and cited G-LOC as a potential cause of death. Urban may have never practiced a simulated malfunction such as our 8/2017 video based on real flight data of 45 rpm. Dangerous Spin (sit while watching)-https://youtu.be/UQ82cvzQHA

BRIEF DESCRIPTION OF THE DRAWINGS

FIG. 1 Key US Built Non-Combat Fighter Jet Crashes (2016-2018)

DETAILED DESCRIPTION

Figure 2:
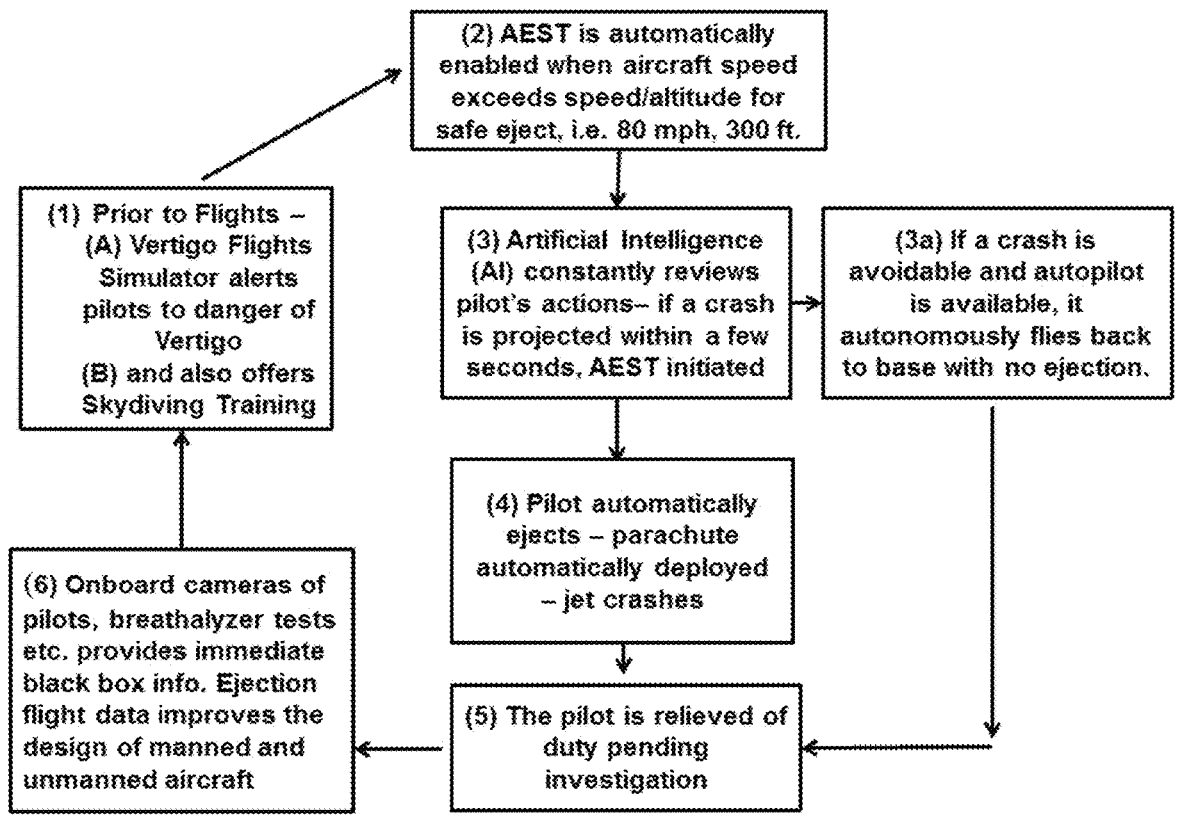
FIG. 2 is an overview Flow Chart logic of the Claims.

This invention offers an integrated state-of-the-art pilot safety system with an amazing combination of sensors, hardware and software technologies which improves pilot safety. FIG. 2 highlights how the system: (1) automatically initiates an ejection if flight data indicates an impending crash and (2) before the flights our technology provides amazing simulations using real flight data to warn pilots of the dangers of Vertigo and G-LOC—death within seconds, plus the Skydiving Tracker—a skydiving simulator which helps train the pilot how to safely steer their parachute after an ejection towards a safe landings.

In FIG. 2 Block 1, prior to Flights, the Simulator alerts pilots to danger of Vertigo and/or G-LOC and also offers Skydiving Training. Block 2 AEST is automatically enabled when aircraft speed exceeds speed/altitude for safe ejections, i.e. 80 mph, 300 ft. Block 3 Artificial Intelligence (AI) constantly reviews the pilot's actions—if a crash is projected and there is no time to abort, then it tells the pilot-"EJECT, EJECT" to prepare the pilot and then automatically cjects the pilot. Block 4 and Block 5—if the pilot is automatically ejected, the pilot's chute is automatically deployed and the pilot (now a skydiver) with training hopefully lands safely. Block 6—flight data, networked or black box, including real-time videos of the pilots provides a database tracking pilot performance, the need for automatic ejections and key accident/debriefing information. It immediately indicates if the pilot is impaired when flying a $100 million jet.

A simulator video can show the flight path of a low-speed aircraft prior to a jump and how it helps train skydiving to land safely either in a normal skydive or after an ejection.

Figure 3:
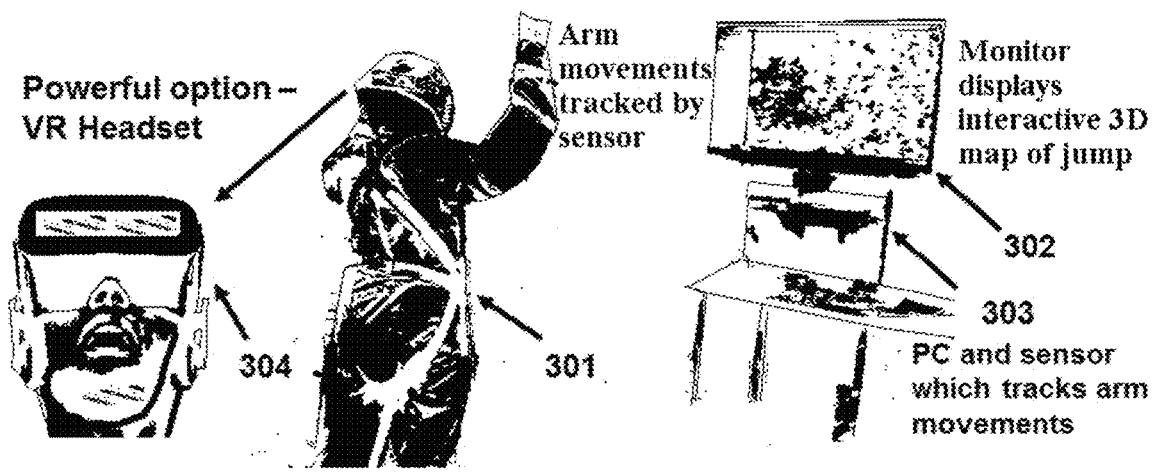
FIG. 3 shows training using our skydiving technology.

FIG. 3 shows 301 training on our non-Virtual Reality version, but a more powerful option shows a VR Headset 304 where no display 302 is needed. The sensor 303 tracks the users' arm movements like a real skydive. The jumper pulls imaginary (or real) toggles which control the chute. If their arms are straight up, they fly at the maximum speed straight ahead but if one arm, i.e., the left, is down they turn left. This technology trains both Ram and round jumpers. The U.S. Forest Service "U.S. Forest Service Ram-Air Parachute System Implementation Project" (6/2015) decided "a "square" ram-air parachute system will eventually replace the "round" FS-14 parachute system currently in use . . . Most jumpers thought that the ram-air is more likely to lead to career ending injuries and fatalities." while this simulator which they could use at work or home could ease their concerns. Using data from only a few jumps, trackers' flight data can simulate the types of parachutes and payloads used. A simulator which can't be customized based on real flight data performance is just a game.

Figure 4:
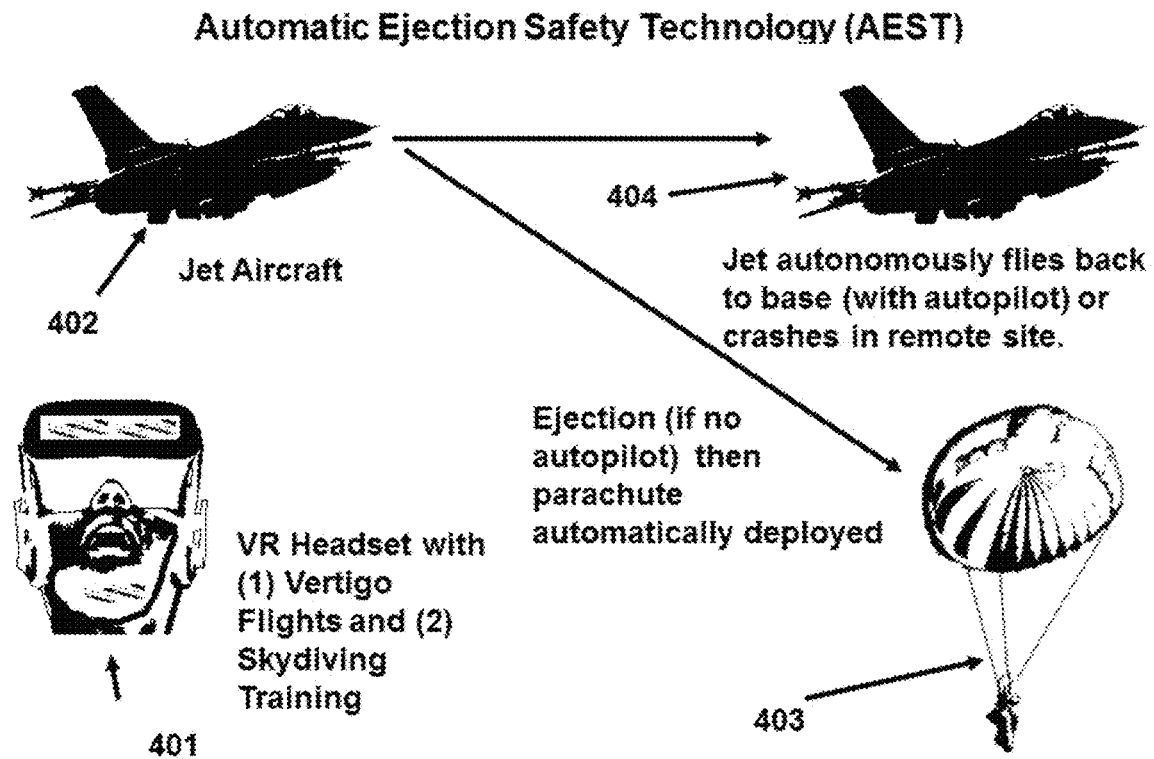
FIG. 4 shows how the system automatically ejects the pilot.

FIG. 4 shows that prior to a flight 401 the pilot trains with a Virtual Reality (VR) Headset which includes: (1) Vertigo/G-LOC Flights and (2) Skydiving Training for both round and RAM parachutes (most ejection systems use round chutes). When the onboard aircraft computers 402 sense an impending crash then the automatic ejection system is activated. However, if there is autopilot available, there is no ejection and the jet flies autonomously back to base.

Crucial Skydiving Database-Over 400 skydives were tracked with the Skydiving Tracker and are part of a growing Jump History. With only 3 clicks all flight data for the aircraft/jumpers is available with interactive 3D maps/videos for debriefings/accident investigations and it's available immediately. Mark Urban's BLM accident report was issued 8 months after his death. Also, they used a flawed data logger (which they invested thousands of dollars in) which "did not render the data useless, but [increased] the degree of uncertainty associated with each data point . . . No information was provided [regarding] the aircraft flight speed."

The Automatic Ejection Safety Technology (AEST) with a Skydiving Simulator for Improving Pilot Safety revolutionizes pilot training and safety with: (1) Virtual Reality Skydiving Simulators which permit practicing at any real locations worldwide before flights and plus simulations to make pilots aware of the dangers of Vertigo and G-LOC and (2) an automatic system which is prepared for any crash within seconds by initiating an automatic pilot ejection is there is no other option or trying to autonomously fly the aircraft back to base. The flight data with cameras monitoring pilots provides stunning 3D interactive maps for post-jump debriefings/accident investigations far beyond existing capabilities. The Skydiving Tracker and Vertigo/G-LOC Flights should be a safety and training tool for all pilots who use ejection seats.

Figure 5:
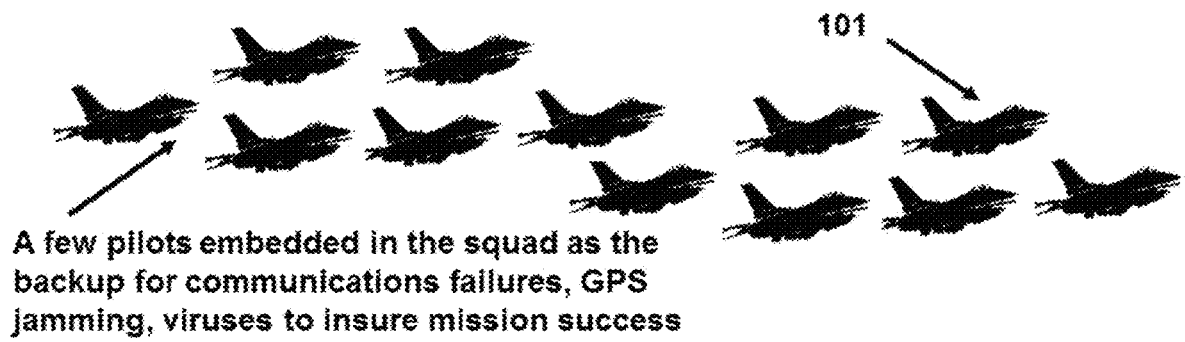
FIG. 5 shows the flowchart logic of the Skydiving Tracker patent which is the parent of this application.

As shown in FIG. 5, and also in the Skydiving Tracker Patent (the parent through a continuation-in-part of this application), GPS data alone, using Artificial Intelligence of the cross-referenced error-corrected GPS data, can identify the type of vehicle (air or ground or even skydive or a walk) and related potential emergencies for that type of vehicle and taking corrective actions for that type of vehicle, and while additional and/or redundant data about the vehicle's speed, and the related acceleration/deceleration can be from accelerometers, this system only requires error-corrected GPS data to anticipate emergencies. With only GPS, the pilot can be tracked from their home, in the car they drive to the aircraft, then in the air, and during the ejection and skydive. This data could be from a phone or a GPS with network communication.

What is claimed is:

1. A safety system for vehicles comprising:
   a system simulator to train and prepare users for the dangers of poor vehicle control, vertigo and/or gravity loss of consciousness G-Loc and virtual reality;
   on board head-up display (HUD), including safe vehicle control databases and a plurality of on-board cameras for tracking user performance;
   the HUD including memory for storing the tracked performance for later analysis;
   the system further tracks performance and determines whether a crash is imminent and determines if the user is unconscious or not responding to commands to control the vehicle;
   once a crash is deemed inevitable, and if the user fails to respond to commands to avoid the crash, then the system can automatically take control;
   at this point a tracker device automatically sends GPS location information to ground emergency personnel which dispatches to the exact user location for providing necessary care to the user and retrieving the vehicle data for the analysis.

2. The safety system of claim 1, wherein the vehicle is an aircraft.

3. The safety system of claim 1, wherein the user is a pilot.

4. The safety system of claim 3, wherein if a crash is inevitable and the pilot fails to respond, the system automatically ejects the pilot from the aircraft by an on-board automatic ejection safety system (AEST).

5. The safety system of claim 3, wherein if the pilot incorrectly ejects when it was not necessary then the autopilot attempts to safely fly the aircraft back to a safe area.

6. The safety system of claim 1, wherein once a crash has occurred, a tracker device automatically sends GPS location information to ground emergency personnel which dispatches to the user location for providing necessary care to the user and retrieving the data for analysis.

7. The safety system of claim 3 wherein simulator is a virtual reality skydiving simulator for training the pilot for practicing skydiving before flight; including virtual reality sensors for tracking the pilot's arm movement for direction and speed of a parachute so the pilot can improve their skydiving skills prior to an ejection.

8. The system of claim 1, wherein the system saves the vehicle data and creates a three-dimensional (3D) interactive map for recreating the sequence events for debriefings and aiding the authorities in accident investigations.

9. The system of claim 1, wherein tracking sensors track the location of the vehicle crash for recovery and investigations.

10. The system of claim 1, wherein Artificial Intelligence (AI) using error-corrected GPS data, which is cross-referenced for vehicle databases, to identify the type of vehicle and related potential emergencies for that type of vehicle and taking corrective actions for that type of vehicle, and while additional and/or redundant data about the vehicle's speed, and the related acceleration/deceleration can use accelerometers, this system only requires error-corrected GPS data to anticipate emergencies.

* * * * *